Nov. 10, 1942.   L. E. NORTON   2,301,635
IMPULSE PHASE MEASURING SYSTEM
Filed Oct. 31, 1941

Inventor
Lowell E. Norton
By
Attorney

Patented Nov. 10, 1942

2,301,635

UNITED STATES PATENT OFFICE 2,301,635

IMPULSE PHASE MEASURING SYSTEM

Lowell E. Norton, Collingswood, N. J., assignor to Radio Corporation of America, a corporation of Delaware Application October 31, 1941, Serial No. 417,381

8 Claims. (Cl. 172—245)

This invention relates to an impulse phase measuring system, and more particularly to a system employing negative transconductance tubes for measuring the phase of an impulse potential with respect to a reference potential of the same frequency, the principal object of my invention being to provide a novel circuit by means of which the phase of an impulse potential may be compared with that of a reference potential.

In accordance with this invention, I employ a pair of pentodes in which the anodes are connected in parallel relation and the suppressor grids are connected in parallel relation, the screen grids being connected to provide a push-pull, balanced output circuit. A reference sinusoidal potential is applied to the inner grid electrodes of the tubes in push-pull relation, and the impulse potential is applied to the suppressor grids. The output circuit of the screen grids includes a pair of serially connected resistors across which is connected a suitable meter. The system is so arranged that, when a negative impulse potential is applied to the suppressor grids in parallel which exceeds a negative biasing potential applied to the suppressor grids, one or the other of the tubes will provide a negative transconductance between the suppressor and screen grids to produce a relatively greater current in one or the other of the aforementioned serially connected resistors, whereby to effect a deflection of the meter indicative of the phase relation between the impulse potential and the reference potential.

Figure 1:
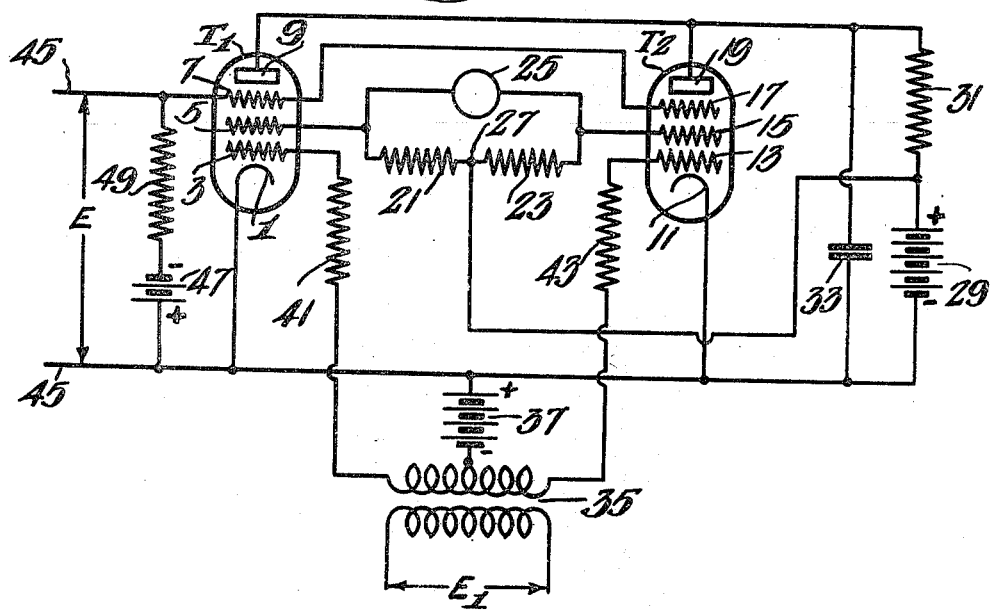
Figure 2:
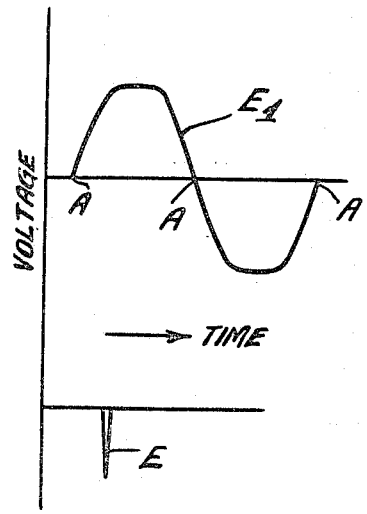

The novel features that I consider characteristic of my invention are set forth with particularity in the appended claims. The invention itself, however, both as to its organization and method of operation, as well as additional objects and advantages thereof, will best be understood from the following description of one embodiment thereof, when read in connection with the accompanying drawing in which Figure 1 is a circuit diagram of one form of my invention, and Figure 2 shows a set of curves of the voltages to be compared.

Referring more particularly to the drawing, I have shown a pair of pentode vacuum tubes $T_1$ and $T_2$, the former being provided with a cathode 1, a grid 3, a screen grid 5, a suppressor grid 7, and an anode 9, and the latter having a cathode 11, a grid 13, a screen grid 15, a suppressor grid 17, and an anode 19. The suppressor grids 7 and 17 are connected in parallel relation, and the anodes 9 and 19 are also connected to each other in parallel relation. The screen grids 5 are connected to each other through a pair of serially connected resistors 21 and 23 across which is connected a suitable indicating device, such as a voltage meter 25. The junction 27 of the resistors 21 and 23 is connected through a battery 29 to the cathodes 1 and 11, the cathode to screen grid circuits thus being connected in push-pull relation and the battery 29 applying a positive potential to the screen grids 5 and 15 relative to the cathodes 1 and 11, respectively. The battery 29 is also connected to the anodes 9 and 19 through a resistor 31 for applying a suitable potential to the anodes to produce the desired negative transconductance, and a capacitor 33 may be connected between the cathodes and the anodes for a purpose presently to be set forth.

The reference potential $E_1$ is applied to the grids 3 through a transformer 35, a battery 37 which is connected between the cathodes and a midtap on the secondary winding of the transformer 35, and resistors 41 and 43, the battery 37 maintaining the grids 3 and 13 negative with respect to their respectively associated cathodes 1 and 3. It will be apparent, therefore, that the reference voltage $E_1$ is fed to the grids 3 and 13 in push-pull relation. The impulse potential E is applied to the suppressor grids 7 and 17 by a suitable input circuit 45, a battery 47 serving to apply a predetermined negative bias potential on the screen grids 7 and 17 through a resistor 49.

The operation of the measuring system constituting my present invention is as follows:

For the signal condition that the impulse voltage E equals zero, the initial biasing potentials of the batteries 37 and 47 and the value of the resistances 21 and 23 are such as to make the currents between the cathode 1 and the suppressor grid 7 on the one hand, and the cathode 11 and the suppressor grid 17 on the other hand, each approximately zero. The reference voltage $E_1$ is preferably sinusoidal in which case larger deflections of the voltmeter 25 will result if the series resistances 41 and 43 are inserted, since the currents from the cathode 1 to the screen grid 5 and the cathode 11 to the screen grid 15 will then be more nearly constant and a maximum during a greater portion of each half cycle of the reference potential $E_1$, when the impulse potential E is applied. For smaller deflections of the voltmeter 25, the resistances 41 and 43 may be omitted. If the reference potential $E_1$ is a sinusoidal wave with its top squared, as shown in Figure 2, the resistances 41 and 43 may also be eliminated.

If the initial currents mentioned in the preceding paragraph are made other than zero, current balance or calibration of the zero reading of the meter 25 will be necessary for operation. For the zero current condition, the potentials across the resistors 21 and 23, respectively, will each be zero and the current through the meter 25 will be zero.

The plates or anodes 9 and 19 serve merely as accelerating electrodes. When a negative impulse potential E which is narrow as compared with the reference potential $E_1$, as shown in Figure 2, is applied to the suppressor grids 7 and 17, then, for the condition when the grid 3 happens to be positive with respect to its cathode 1 and the grid 13 is negative with respect to its cathode 11, electrons which would have passed from the cathode 1 through the grids 3, 5 and 7 and on to the anode 9 are turned back by the negative potential on the suppressor grid 7 and appear on the screen grid 5. Current therefore flows through the circuit in which the resistor 21 appears. During the same time, since the reference potentials on the grid 3 and the grid 13 are 180 degrees out of phase, the inner grid 13 goes more negative and few or no electrons pass from the cathode 11 through the grid 13 to the electrodes 15, 17 and 19. Current through the circuit in which the resistor 23 appears therefore remains approximately zero. Hence, the meter 25 will deflect either to the right or to the left depending upon the meter polarity.

If the phase of the potentials E and $E_1$ is changed so that the impulse occurs when the grid 13 is positive and the grid 3 is negative, instead of the reverse condition, current will flow through the circuit of resistor 23 and the current through the circuit of the resistor 21 will remain approximately zero. The deflection of the meter 25 will, therefore, be opposite in direction to that of the first case considered above.

The only condition for which the cathode 1 to grid 3 potential and the cathode 11 to grid 13 potential will be equal occurs when the impulse potential E appears when the reference potential $E_1$ is at zero, or at the points A in Figure 2. For this condition, the currents through the circuit of the resistor 21 and that in the circuit of the resistor 23 are equal and approximately zero, so that the deflection of the meter 25 will be zero.

As has been explained heretofore, a zero deflection of the meter 25 indicates that the impulsive potential occurs at the zero magnitude of the reference potential $E_1$. A deflection of the meter in one direction indicates a phase difference either positive or negative (depending upon meter polarity) from a zero condition, while a meter deflection in the other direction indicates a phase difference of the opposite sign. Furthermore, the meter deflection is a function of the phase deviation from zero condition so that, by calibration, the meter 25 will indicate directly the phase relation between the impulse potential E and the reference potential $E_1$. For most tubes $T_1$ and $T_2$, it is desirable to provide the capacitor 33 between the accelerating electrodes or anodes 9 and 19 and their respective cathodes 1 and 11 in order to obtain maximum value of negative transconductance during the period of impulse.

Although I have shown and described but one embodiment of my invention, it will be apparent to those skilled in the art that many other modifications, as well as variations in that described, are possible. I, therefore, desire that my invention shall not be limited except insofar as is made necessary by the prior art and by the spirit of the appended claims.

I claim as my invention:

1. In a system for indicating the phase relation between an impulse potential and a sinusoidal reference potential, the combination of a pair of vacuum tubes each having a cathode, a first grid, a second grid, a third grid and an anode in the order named, said anodes being connected in parallel relation and said third grids being also connected in parallel relation, means connecting said second grids in balanced relation to provide a balanced output circuit, an indicating device connected to said output circuit, means for feeding said reference potential to said first grids, and means for feeding said impulse potential to said third grids.

2. In a system for indicating the phase relation between an impulse potential and a sinusoidal reference potential, the combination of a pair of vacuum tubes each having a cathode, a first grid, a second grid, a third grid and an anode in the order named, said anodes being connected in parallel relation and said third grids being also connected in parallel relation, means connecting said second grids in push-pull relation to provide a balanced output circuit, an indicating device connected to said output circuit, means for feeding said reference voltage in push-pull relation to said first grids, and means for feeding said impulse potential to said third grids.

3. In a system for indicating the phase relation between an impulse potential and a sinusoidal reference potential, the combination of a pair of vacuum tubes each having a cathode, a first grid, a second grid, a third grid and an anode in the order named, said anodes being connected in parallel relation and said third grids being also connected in parallel relation, means for applying a negative bias potential to said third grids relative to said cathodes, means connecting said second grids in balanced relation to provide a balanced output circuit, an indicating device connected to said output circuit, means for feeding said reference potential to said first grids, and means for feeding said impulse potential to said third grids, the application of a negative potential to said third grids by said impulse potential in excess of said negative bias potential causing an increase of current in said output circuit and producing an indication on said indicating device representing the phase relation between said potentials.

4. In a system for indicating the phase relation between an impulse potential and a sinusoidal reference potential, the combination of a pair of vacuum tubes each having a cathode, a first grid, a second grid, a third grid and an anode in the order named, said anodes being connected in parallel relation and said third grids being also connected in parallel relation, means for applying a negative bias potential to said third grids relative to said cathodes, means connecting said second grids in balanced relation to provide a balanced output circuit, an indicating device connected to said output circuit, means for feeding said reference potential to said first grids, said last-named means including means for applying a negative bias to said first grids, and means for feeding said impulse potential to said third grids, the application of a negative potential to said third grids by said impulse potential in excess of said first-named negative bias potential causing an increase of current in said output circuit and producing an indication on said indicating device representing the phase relation between said potentials.

5. The invention set forth in claim 4 characterized in that the means connecting said second grids includes a pair of series connected resistors, and characterized further in that said indicating device is connected across said resistors.

6. The invention set forth in claim 4 characterized in that the means connecting said second grids includes a pair of series connected resistors, characterized further in that said output circuit includes a connection between the junction of said resistors and each of said cathodes whereby the circuits of said second grids are connected in push-pull relation, and characterized still further in that said indicating device is connected across said resistors.

7. The invention set forth in claim 4 characterized by the addition of means for applying to said second grids a bias potential which is positive relative to said cathodes.

8. The invention set forth in claim 4 characterized by the addition of means including a resistor for applying to said anodes a predetermined positive biasing potential relative to said cathodes, and characterized further by the addition of a capacitor connected between said cathodes and said anodes.

LOWELL E. NORTON.